United States Patent Office 3,238,283
Patented Mar. 1, 1966

3,238,283
METHODS OF PRODUCING SHAPED PRODUCTS OF POLYVINYL ALCOHOL
Kiyoshi Fujii, Saburo Imoto, Takeshi Inoue, and Junji Ukida, Kurashiki, Japan, assignors to Kurashiki Rayon Co., Ltd., Okayama, Japan, a corporation of Japan
No Drawing. Filed Nov. 16, 1961, Ser. No. 152,904
Claims priority, application Japan, Nov. 29, 1960, 35/46,688
2 Claims. (Cl. 264—210)

The invention relates to the production of polyvinyl alcohol fibers or other shaped forms of polyvinyl alcohol which are characterized by outstanding properties.

Numerous studies have been made in connection with the manufacture of polyvinyl alcohol fibers and other polyvinyl alcohol shaped products such as films, and the like, but most of them have involved methods in which a water solution of polyvinyl alcohol is used as the spinning solution from which the shaped products are formed and, in order to impart to the shaped products sufficiently high water resistance, dyeability and other properties to meet practical requirements, acetalization and various other types of chemical treatments have been employed. However, in this case, it is difficult to produce a shaped polyvinyl alcohol product having sufficient resistance to hot water without applying some special chemical treatment. Furthermore, in an effort to improve various properties of shaped polyvinyl alcohol products, an attempt has been made to alter the character of the raw material from which the polyvinyl alcohol is formed. For example, a method is known in which, by polymerizing vinyl acetate with a low conversion, and using the resultant polyvinyl acetate to form polyvinyl alcohol, a polyvinyl alcohol shaped product which is somewhat resistant to hot water can be produced. It has also been attempted to improve the character of the shaped polyvinyl alcohol product by polymerizing vinyl acetate at a low temperature. It has been found that a highly crystalline polyvinyl alcohol can be produced from polyvinyl acetate which is prepared at low polymerization temperatures, or in the presence of specific polymerizing solvents. Films of polyvinyl alcohol thus obtained have a low degree of swelling in water, and shaped products having a high melting point, good hot water-resistance and heat-resistance can be expected from such polyvinyl alcohol. However, it is still considered difficult to obtain shaped products of polyvinyl alcohol having desired high mechanical properties by spinning or other shaping of the products in conventional manner. This is believed to be due to the fact that, as the molecular structure of polyvinyl alcohol becomes more regular, the polyvinyl alcohol becomes more difficultly soluble in water, and it becomes impracticable to form a satisfactory solution for spinning or other shaping. It has also been experimentally observed that when the degree of crystallinity of polyvinyl alcohol reaches a certain value, satisfactory spinning cannot be effected even though spinning is effected with a water solution by conventional methods. We have also found that by polymerizing vinyl formate under specific temperature conditions it is possible to produce a polyvinyl formate from which can be formed a polyvinyl alcohol with a high degree of crystallization, which result cannot be obtained from vinyl acetate, but the spinning of the polyvinyl alcohol obtained by this procedure is even more difficult.

It is accordingly an object of the present invention to provide a process of producing polyvinyl alcohol in the form of fibers or in other shaped forms having a hot water-resistance sufficient for practical purposes and excellent mechanical properties, without resort to acetalization and other chemical treatments and without having to abandon conventional spinning or like shaping techniques.

In accordance with the present invention, a polyvinyl formate obtained by polymerization of vinyl formate at low temperature is spun or otherwise shaped, and the shaped product is then saponified to convert it to a shaped polyvinyl alcohol product, which is then elongated under heat. Thus, a fiber or other shaped product is spun or otherwise formed from a polyvinyl formate having a relatively high degree of regular molecular structure obtained by polymerization of vinyl formate at a polymerization temperature of below 40° C., and the shaped polyvinyl formate is saponified to produce a correspondingly polyvinyl alcohol product, which is then elongated under heat, whereby a shaped polyvinyl alcohol product which combines strong resistance to hot water and excellent mechanical properties is produced. This result is realized only when the raw material for the preparation of the polyvinyl alcohol is polyvinyl formate of the character indicated.

We have discovered that by polymerizing vinyl formate at low temperatures, crystalline or crystallizable polyvinyl formate can be produced and, by saponifying this polymerization product using conventional techniques, a highly crystalline polyvinyl alcohol can be obtained. The vinyl formate polymers used in accordance with the present invention are those having a relatively highly regular molecular structure such as produced by polymerization at a temperature below 40° C. This polyvinyl formate is readily extruded, spun, or otherwise formed into a fiber, film or other shaped form in conventional manner, and then saponified in a conventional saponification medium, such as in an alcohol solution containing an acid or alkaline saponification catalyst to convert the shaped polyvinyl formate into shaped polyvinyl alcohol. Then the fiber or film, or other shaped form is rinsed, dried and elongated to 5–20 times its original length under a temperature of 220–270° C., which is followed by thermal contraction at a temperature of 210–260° C., whereby a fiber, film or other shaped product having sufficient resistance to hot water as well as excellent mechanical properties is obtained.

It is one of the advantages of the present invention that saponification of the shaped polyvinyl formate can effectively be carried out in a short time, with a high conversion which is unattainable by conventional methods when polyvinyl acetate is employed as the raw material to be saponified after spinning or shaping. A further advantage is that the yarn or film produced can be reeled on a coil or formed into a hank without sticking even when closely wound, and can be readily reeled off without breaking. Furthermore, even when multi-filaments are spun and saponified, the filaments will not adhere to one another, so that saponification can be effected satisfactorily. On the contrary, if saponification is conducted conventionally with a polyvinyl acetate fiber, it is essentially impossible to achieve effective saponification to a sufficiently high degree of saponification, and when saponification is effected upon multi-filaments, it is almost impossible to retain the original shape of the product.

Polyvinyl alcohol produced from polyvinyl formate has a desirable degree of crystallinity, but is difficult to spin from a water solution by conventional methods, as mentioned above. It often happens that elongation of the fibers cannot be effected under heat after spinning. For this reason, the so-produced fibers may have resistance to hot water, but they may not have sufficient mechanical properties. This is believed to be due to the fact that the structure of the yarn differs from that of ordinary polyvinyl alcohol fibers with respect to solubility and with respect to the stability of the spinning solution. The fibers obtained by the method of the present invention, which involves saponification after spinning or other shaping, have a different structure from fibers spun from a water solution, and they can readily be subjected to elongation under heat. This is also one of the significant characteristics of the process of this invention. When polyvinyl formate fibers are saponified in accordance with the present invention, it may not be practicable to effect saponification upon fibers which have been highly elongated and orientated. Accordingly, in accordance with the invention, use is made of a polyvinyl formate which has not elongated at all before saponification, or which has been elongated only a few times its original length, and this polyvinyl alcohol is subjected, after saponification, as mentioned, to elongation to a length 5–20 times its original length at a temperature of 220–270° C., and is then subjected to thermal contraction at a temperature of 210–260° C., so that the ultimate elongation coefficient of the yarn is more than 5 times that of the original yarn.

There have been some attempts to obtain polyvinyl alcohol fibers by treating polyvinyl acetate yarn or film with alkali metal alcoholate, or by spinning it into alkaline methanol. By such methods, even though sufficient heat treatment is given, it is difficult to obtain simultaneously mechanical and water-proof properties which are sufficient for practical usage. Thus, a polyvinyl alcohol fiber having properties sufficient for practical use cannot be produced without employing some chemical treatment. There is a method of obtaining orientated and hot water-soluble polyvinyl alcohol fibers, in which, using a vinyl acetate polymer, the fiber is orientated and saponified, but this method is entirely different from the method of the present invention. The present invention makes possible the production of a polyvinyl alcohol having a highly regular molecular structure which exhibits a desirable combination of advantageous properties and this product is obtained by the method described by molding and spinning a polyvinyl formate prepared under designated temperature conditions, followed by saponification.

The invention will be further understood from the following specific examples of practical application. However, it will be understood that these examples are not to be construed as limiting the scope of the present invention in any manner. In the examples, all parts are by weight unless otherwise indicated.

*Example 1*

To 100 parts of vinyl formate, was added 0.05 part of 2,2′-azobisisobutyronitrile, and polymerization was effected in a nitrogen atmosphere at 30° C. for 50 hours. The yield was 95%. The limiting viscosity number of an acetonitrile solution of the polymer at 80° C. was 0.053. The degree of polymerization calculated on the basis of the viscosity equation was about 1,350. This polyvinyl formate was melted at 150° C. and extruded from holes of 0.2 mm. diameter, and reeled up. The polyvinyl formate fibers had a denier of about 200. The fibers were reeled and dipped in a methanol solution of 1 N caustic soda, and after soaking for 30 min., the fibers were rinsed with methanol, and dried. After drying, the fibers were elongated by 500% at 230° C. The polyvinyl alcohol fibers thus obtained had a denier of 20 and a dry strength of 5 g./denier.

*Example 2*

The polyvinyl formate obtained in Example 1 was melted at 150° C. as in Example 1 and extruded through holes of 0.2 mm. in diameter. Then the fibers were passed through a methanol bath saturated with caustic soda at 30° C. in the course of 40 sec. The fibers were then passed through a methanol bath acidified with hydrochloric acid and reeled. Then they were washed with methanol, and rinsed with water. After drying, the fibers were elongated to a length 10 times their original length at 230° C. The fibers were also subjected to a thermal contraction of 5% at 225° C. The thus-treated fibers had a dry strength of 9.8 g./denier and significant hot-water resistance.

The conditions and relative relationships set forth in the examples are those preferred but it will be understood that other conditions and relationships may be used within the scope of the invention. In general, unless otherwise indicated, conventional operations and techniques are suitably employed. For example, the polymerization catalyst employed may be any of the conventional catalysts used in the polymerization of vinyl formate, such as azonitriles or peroxides, but the use of azonitriles is preferred. Thus, conventional vinyl formate polymerization techniques, catalysts, temperatures and polymerization apparatus are employed and suitable polymerization catalysts, vessels and techniques are described, for example, in Hatchard et al. U.S. Patent 2,610,359. Temperatures down to 0° C. are suitably used. Conventional techniques and operations are also employed in the conversion of the polyvinyl formate shaped products into polyvinyl alcohol.

With respect to known saponification media and solvents and catalysts which may be employed for producing polyvinyl alcohol from polyvinyl formate shaped products, reference is suitably made, for example, to Bristol U.S. Patent 2,700,035, Waugh et al. U.S. Patent 2,642,419, Germain U.S. Patent 2,643,994, and Cottet et al. U.S. Patent 2,936,488.

In like manner the polyvinyl formate is formed into fibers, films, and other shaped forms by following conventional practice, commonly employed in shaping polyvinyl alcohol and polyvinyl esters. The spinning of a polyvinyl compound to form fibers is described, for example, in the above-mentioned Hatchard et al. U.S. Patent 2,610,359, in Osugi et al. Patent 2,906,594, and in the above-mentioned Cottet et al. patent.

In any case, conventional spinning operations are employed in producing the fibers and subsequent stretching and relaxation are effected using known techniques as described, for example, in said patents.

Similarly, films and other shaped forms of polyvinyl formate are suitably produced in conventional manner by the techniques described, for example, in Schnabel U.S. Patent 2,177,612 and in U.S. Patents 2,236,061 and 2,837,770.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:

1. A method of producing a shaped polyvinyl alcohol product having strong resistance to hot water and excellent mechanical properties which comprises preparing a shaped form polyvinyl formate product, said polyvinyl formate having been produced by polymerization of vinyl formate monomer at a temperature below 40° C., saponifying said shaped polyvinyl formate product in the presence of a saponification catalyst to convert said shaped polyvinyl formate product to polyvinyl alcohol having the same shaped form as said polyvinyl formate product, said polyvinyl formate product being maintained at a length substantially equivalent to its original length prior to said saponification, rinsing and drying said shaped form polyvinyl alcohol, elongating said shaped form polyvinyl alcohol to a length which is about 5 to about 20 times the original length of said shaped form polyvinyl alcohol at a temperature of about 220° C. to about 270° C., and thermally contracting said shaped form polyvinyl alcohol at a temperature of about 210° C. to about 260° C. to produce a polyvinyl alcohol product that has an ultimate elongation of more than 5 times that of the original shaped form polyvinyl alcohol.

2. A method of producing a polyvinyl alcohol fiber product having strong hot water resistance and excellent mechanical properties which comprises spinning polyvinyl formate to form polyvinyl formate fibers, said polyvinyl formate having been produced by the polymerization of vinyl formate monomer at a temperature below 40° C., saponifying said polyvinyl formate fibers in the presence of a saponification catalyst to convert said polyvinyl formate fibers to polyvinyl alcohol fibers, said polyvinyl formate fibers being maintained at a length substantially equivalent to their original length prior to saponification, rinsing and drying said polyvinyl alcohol fibers, elongating said polyvinyl alcohol fibers to a length which is about 5 to about 20 times the original length of said polyvinyl alcohol fibers at a temperature of about 220° C. to about 270° C., and thermally contracting said polyvinyl alcohol fibers at a temperature of about 210° C. to about 260° C. to produce a polyvinyl alcohol fiber product that has an ultimate elongation more than 5 times that of the original polyvinyl alcohol fiber.

References Cited by the Examiner

UNITED STATES PATENTS

| | | | |
|---|---|---|---|
| 2,610,359 | 9/1952 | Hatchard et al. | 18—54 |
| 2,700,035 | 1/1955 | Bristol | 18—54 XR |
| 2,936,488 | 5/1960 | Cottet et al. | 18—54 XR |
| 3,041,324 | 6/1962 | De Coene et al. | 260—89.1 |
| 3,063,787 | 11/1962 | Rynkiewicz et al. | 18—54 |
| 3,067,185 | 12/1962 | De Coene et al. | 260—89.1 |
| 3,105,065 | 9/1963 | Fujii et al. | 260—89.1 |
| 3,111,508 | 11/1963 | Imai et al. | 260—89.1 |
| 3,134,758 | 5/1964 | Imoto et al. | 260—89.1 |

FOREIGN PATENTS 482,216   3/1938   Great Britain.

ALEXANDER H. BRODMERKEL, *Primary Examiner.*
WILLIAM STEPHENSON, MORRIS LIEBMAN,
*Examiners.*